United States Patent [19]

Warncke

[11] Patent Number: 5,236,605
[45] Date of Patent: Aug. 17, 1993

[54] METHOD AND APPARATUS FOR CONTINUOUS SEPARATION OF OIL FROM SOLID AND LIQUID CONTAMINANTS

[75] Inventor: Glennwood Warncke, McQueeney, Tex.

[73] Assignee: Horizontal Rentals, Inc., Seguin, Tex.

[21] Appl. No.: 909,728

[22] Filed: Jul. 7, 1992

[51] Int. Cl.$^5$ ............................................. B01D 17/032
[52] U.S. Cl. ..................................... 210/799; 210/525; 210/800; 166/267
[58] Field of Search ................ 210/776, 170, 519, 513, 210/703, 195.1, 195.3, 201, 805, 923, 799, 800, 803, 529, 523, 512.2, 525; 55/40, 43, 44, 45, 203; 166/267, 357; 208/402

[56] References Cited

U.S. PATENT DOCUMENTS

| | | | |
|---|---|---|---|
| 3,705,626 | 12/1972 | Glenn, Jr. et al. | 166/267 |
| 4,252,699 | 2/1981 | Favret, Jr. | 210/170 |
| 4,466,154 | 8/1984 | Urbani | 210/534 |
| 4,783,272 | 11/1988 | Patterson | 210/512.2 |
| 4,889,638 | 12/1989 | Rockford et al. | 210/703 |
| 4,913,819 | 4/1990 | Patterson | 210/523 |
| 4,929,348 | 5/1990 | Rice | 210/170 |
| 4,948,393 | 8/1990 | Hodson et al. | 55/43 |
| 5,015,399 | 5/1991 | Eller | 210/776 |
| 5,055,180 | 10/1991 | Klaila | 208/402 |
| 5,133,882 | 7/1992 | Stearns | 210/776 |

Primary Examiner—Robert A. Dawson
Assistant Examiner—W. L. Millard
Attorney, Agent, or Firm—Gunn, Lee & Miller

[57] ABSTRACT

An oil separation method and apparatus for the continuous separation of acceptable oil from contaminated oil containing solids and liquids withdrawn from an oil well. Three separate settling tanks are partitioned and provided with skimmers, as appropriate, to enable contaminated oil to dwell sufficiently within the tanks. After sufficient dwell time, the skimmers remove separated oil from the top layer and move it to an oil tank. Liquids such as water and emulsified oil are separated into an intermediate layer and moved to further settling tanks to provide sufficient dwell time for oil separation and collection. The first settling tank has a rotating jet spray header for agitating the solids accumulated in the bottom of the first tank and a series of suction headers for withdrawing the solids without interruption of the top oil layer or the separation operation.

4 Claims, 5 Drawing Sheets

METHOD AND APPARATUS FOR CONTINUOUS SEPARATION OF OIL FROM SOLID AND LIQUID CONTAMINANTS

BACKGROUND OF THE INVENTION

The present invention relates to oil separation systems for oil field facilities. More particularly, the present invention is a method and apparatus for the continuous separation of oil from solid and liquid contaminants at the site of oil field drilling operations.

The current method for separating oil from solid and liquid contaminants involves the use of a multiplicity of open-top separation tanks in which contaminated oil withdrawn from the well is allowed to settle out or separate by gravity. As contaminated oil is withdrawn and directed to the first tank, the heavier solids fall to the bottom of the first tank and lighter oil/water overflows a weir or a series of weirs and continues on to subsequent tanks. In the second and successive tanks, the heavier water tends to gravitate to the lower portion of a tank, is pumped off, cleaned and, usually, reinjected into the well head. Slight variations on the process exist, such as the use of one large tank with a series of overflow weirs, but generally the above description is the state of the art.

A significant disadvantage of current technologies is that increasing flow rates from the wellhead necessitate the addition of tanks in order to provide additional settling time. The more tanks required, the more crowded and confused becomes the well site. Serious environmental problems are created as trenches are dug around the tanks to handle possible overflows and splashing. The greater the number of open tanks at the site, the greater the chances of fire and ambient gas problems. The gas problems are inherent with open tanks because the lighter, more volatile hydrocarbons evaporate to the region immediately above the oil surface layer in the tanks. The greater the number of tanks, the greater the overall open, exposed surface area of oil, and the greater the level of ambient gases.

Therefore, any system which can reduce the number of tanks required and at the same time handle a greater input flow rate resolves long standing problems in the industry. The present invention is such an improvement.

Another major problem with existing separation systems relates to downtime. Anytime flow from the wellhead must be interrupted, there is a corresponding loss of production and profit. In some cases, depending on the selling price of oil, the cost of downtime may be $2,000 per hour. Assuming that the flow rates are controlled and the oil separation system is balanced, downtime, except for mechanical/electrical equipment failure, may be minimized, but not eliminated in existing systems. The reason for this downtime is that the solid contaminants (also known as drill cuttings or shale) in the first settling tank gradually build up and reduce the effective dwell time of the contaminated oil in the tank. Further, as the solids build up in the first tank, the bottom of the tank is effectively "raised" and splashing of incoming liquid increases, increasing the safety hazards to man and the environment.

At some point in the operation of existing separation systems, the incoming oil flow must be stopped and the first separation tank cleaned of the built up solids. Normally any head of liquid is pumped off of the top of the solid material by use of a flexible suction line and a portable pumping system. The solid material is then manually or mechanically shoveled out of the tank and disposed of at a remote location. Alternatively, clean drilling fluid is combined with the drill cuttings and transferred to the on-site shaker assembly for separation at considerable cost. In any case, the existing procedures call for the curtailment of separation operations during the removal of solid cuttings from the settling tanks.

The present invention provides a method and apparatus for allowing the solid cuttings to be removed from the bottom of the settling tank without interruption of the continuous separation operation. Therefore, with the present invention, it is possible to eliminate expensive downtime currently necessitated by the removal of solid contaminates from the settling tanks.

When the unique features of the present method and apparatus are combined, increased flow rates and flow durations may be achieved with fewer settling tanks, reduced safety hazards, and far less negative impact on the environment at the well site. Thus, the present invention solves long-standing problems and meets long-felt needs in oil field operations.

SUMMARY OF THE INVENTION

The present invention provides a method and apparatus for continuous separation of oil from solid and liquid contaminants from oil withdrawn from a well head. The apparatus includes a first settling tank with a gas separator in the first settling compartment of the tank. The separator allows fluids (including particulate solids) to be delivered to the bottom of the settling tank eliminating splashing and agitation. Within the first settling tank at the bottom of the first compartment is disposed a rotating jet spray header which periodically is activated to dilute and break up accumulated solids. A series of suction lines withdraw the solids from the bottom of the first tank for disposal without disruption of the oil layer or interruption of the separation process.

A series of skimmers extend into the first settling tank, collect and route separated oil from a top oil layer to a final oil collection tank. Contaminated water/oil in the immediate layer is directed to a second settling tank.

Within the second settling tank is a second series of skimmers for collecting and routing separated oil from a top layer of oil in the second tank to the final oil collection tank. The remaining water in the second settling tank may be injected back into the oil well.

At the oil collection tank a final separation of any residual water is accomplished with acceptable oil (less than 2% water) transferred to oil storage tanks, and residual water directed back into the separation system or the well head.

DETAILED DESCRIPTION OF THE PREFERRED EMBODIMENT

Figure 1:
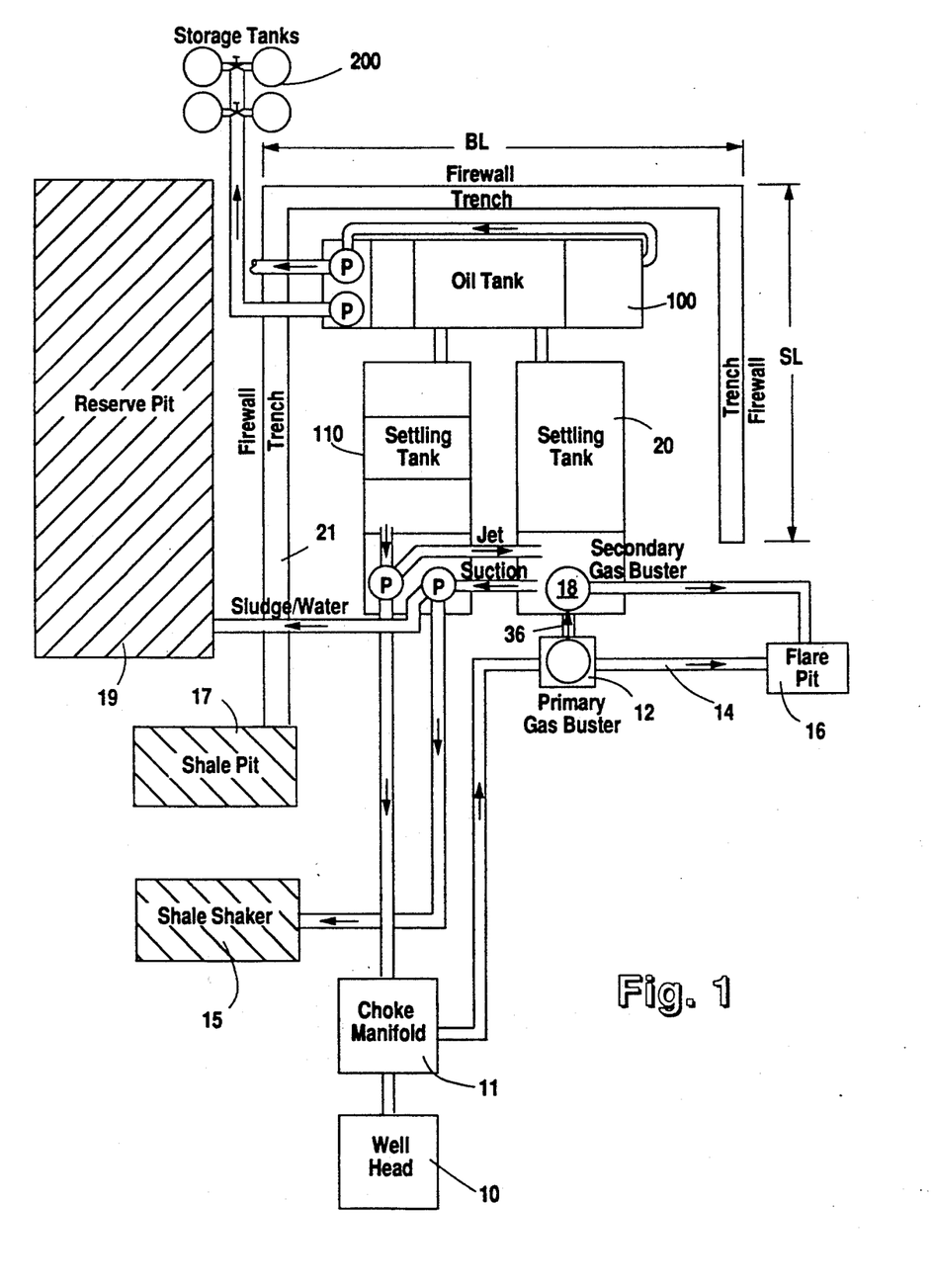
FIG. 1 illustrates a block diagram of the site layout of an oil separation operation incorporating the oil separation method and apparatus of the present invention.

FIG. 1 illustrates in a general block diagram the layout of an oil separation operation employing the oil separation method and apparatus of the present invention. Contaminated oil with shale, gas, water, well mud, etc. is pumped from the well head 10 through choke manifold 11 to a primary gas separator 12, or as the device is often called in the trade, a "gasbuster", as is common in the industry. At the primary gas separator 12, the well head output is discharged into the gas separator 12 and the gas portion separated and vented through vent line 14 to the flare pit 16.

The contaminated liquids are then normally directed into the top of a first settling or liquid separating tank. Normally, residual gases are still entrapped in the liquid portion and when the liquid is directed into the first settling tank, there is considerable turbulence and splashing of the liquid. Because the liquid is directed into the top of the first settling tank, and because there are slugs of entrapped gas, normally significant environmental mess is created at the first tank. Contaminated oil/water/solids splash over the sides of the tank onto the ground and volatile gases are released above the separation tank.

In the present invention, however, the liquid discharge from the primary gas separator 12 is transferred to a specially constructed secondary gas separator 18 built into the inside of the first settling tank 20. Settling tank 20 is a generally rectangularly shaped steel container with an open top. Tank 20 is 42 feet 5 inches long by 10 feet 1 inch wide by 8 feet 1 inch high with a volumetric capacity of approximately 615 barrels.

FIG. 1 further illustrates the space saving configuration of the present invention. Because only three settling tanks 20, 110, 100 are needed, firewall or trench 21 takes up considerably less space. For example, the back length BL of trench 21 need only be 60–65' while the side length SL need only be 65–70'. Shale shaker 15, shale pit 17 and reserve pit 19 may also be conveniently positioned to reduce space. The number of acceptable oil storage tanks 200 may be minimized because of the overall efficiency of the present invention.

Figure 2:
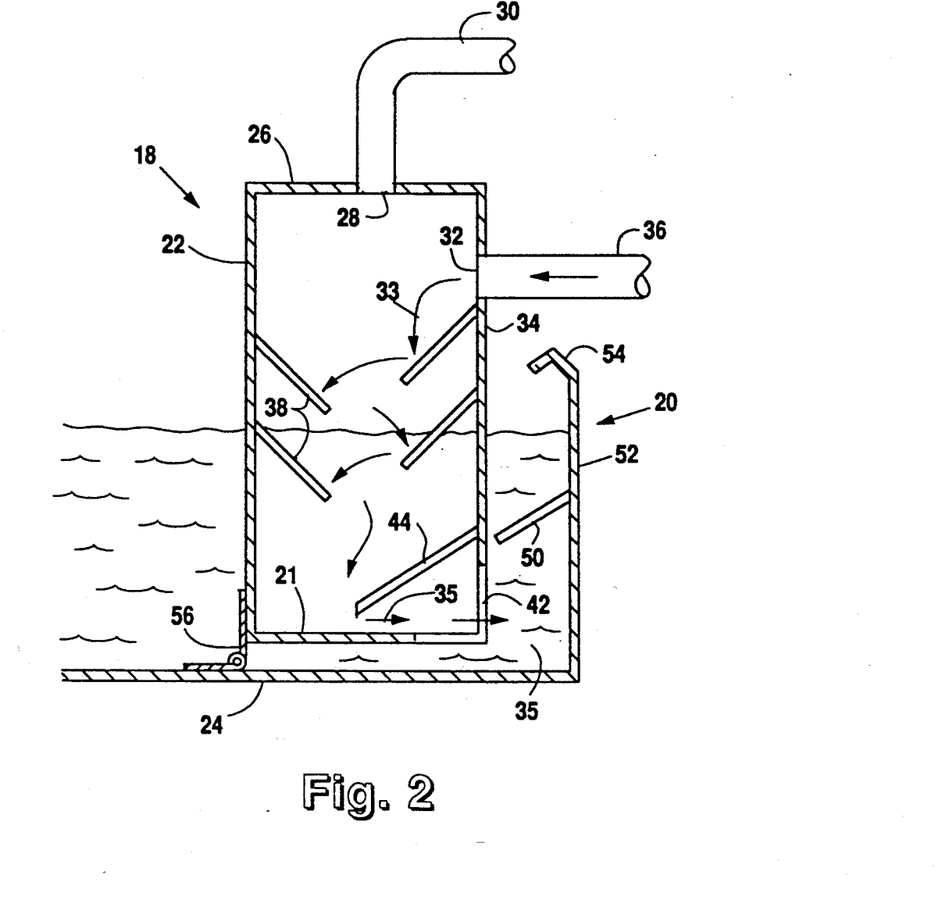
FIG. 2 illustrates the secondary gas separator of the present invention.

FIG. 2 illustrates the general construction of gas separator 18. A generally cylindrical steel, pressure vessel 22, approximately 10 feet high with an inside diameter of approximately 30 inches, is hingedly attached to the bottom 24 of the first settling tank 20. The top 26 of vessel 22 is closed except for gas vent port 28 which is sealingly connected to vent line 30. Vent line 30 discharges vented gas to the flare pit 16. Vessel 22 further has an inlet opening 32 positioned so as to receive fluid input tangentially into vessel 22 at the upper sidewall 34. Contaminated liquid 33 containing residual gases, solids, water and oil flow from the primary gas separator 12 through pipe 36 into inlet opening 32. On the inside of the vessel 22, a series of baffle plates 38 extend inwardly and slope downwardly toward the center of the gas separator. As fluid flowing into the vessel strikes the baffle, entrapped gases are released to be vented through port 28 and sent to the flare pit 16. Liquids and solids move toward the bottom of the vessel.

The bottom 21 of vessel 22 is generally closed except that a section of the bottom and portion of its intersecting sidewall are removed to create an opening 42 in the bottom of the vessel as seen in FIG. 2. Immediately above this opening 42 and extending from the inside of sidewall 34 is a downwardly sloping, extended baffle 44. Baffle 44 extends above opening 42 to reduce the turbulence of the liquid splashing into the vessel and to move the solids toward the bottom of the vessel and tank. Contaminated liquid 35 with solids, water, and oil passes through opening 42 into tank 20 at the bottom level of the tank further eliminating the splashing problems of the prior art. Thus rather than liquid falling into the top of the first separation tank, the liquid to be separated enters the first tank at the bottom of the tank.

The bottom 21 of vessel 22 is raised a few inches above the bottom 24 of tank 20 and is supported by hinge member 56. Hinge 56 enables the vessel to be pivoted away from the front wall 52 and placed horizontally on the bottom of tank 20 during transport of the tank. Obviously, inlet and outlet piping must be uncoupled prior to pivoting vessel 22 into its transport position. Also during final cleaning of tank 20 prior to transport, vessel 22 may be pivoted rearwardly to allow for cleaning under the vessel.

To even further reduce the likelihood of splashing and liquid surging over the sides of the settling tank, a deflector plate 50 is welded to the front wall 52 of tank 20 immediately opposite above opening 42 in gas separator 12. Plate 50 extends inwardly from the front wall 52 approximately 18-24 inches and is approximately 48-60 inches long.

Should a blast or slug of gas get through the gas separator 12 and be discharged into the tank 20, plate 50 will dissipate the surge over a greater surface area and reduce the likelihood of a bubbling of liquid over the sides of the tank 20. Along the top edge of the front walls 52 of the tank 20 is an inwardly projecting L-shaped splash lip 54. Again, the purpose of the lip 54 is to reduce the chances of liquid splashing over the side of the tank in case of gas surges. A similar lip extends along the top edge of the two sidewalls of the forward section of the tank 20 as is shown in FIG. 3.

Figure 3:
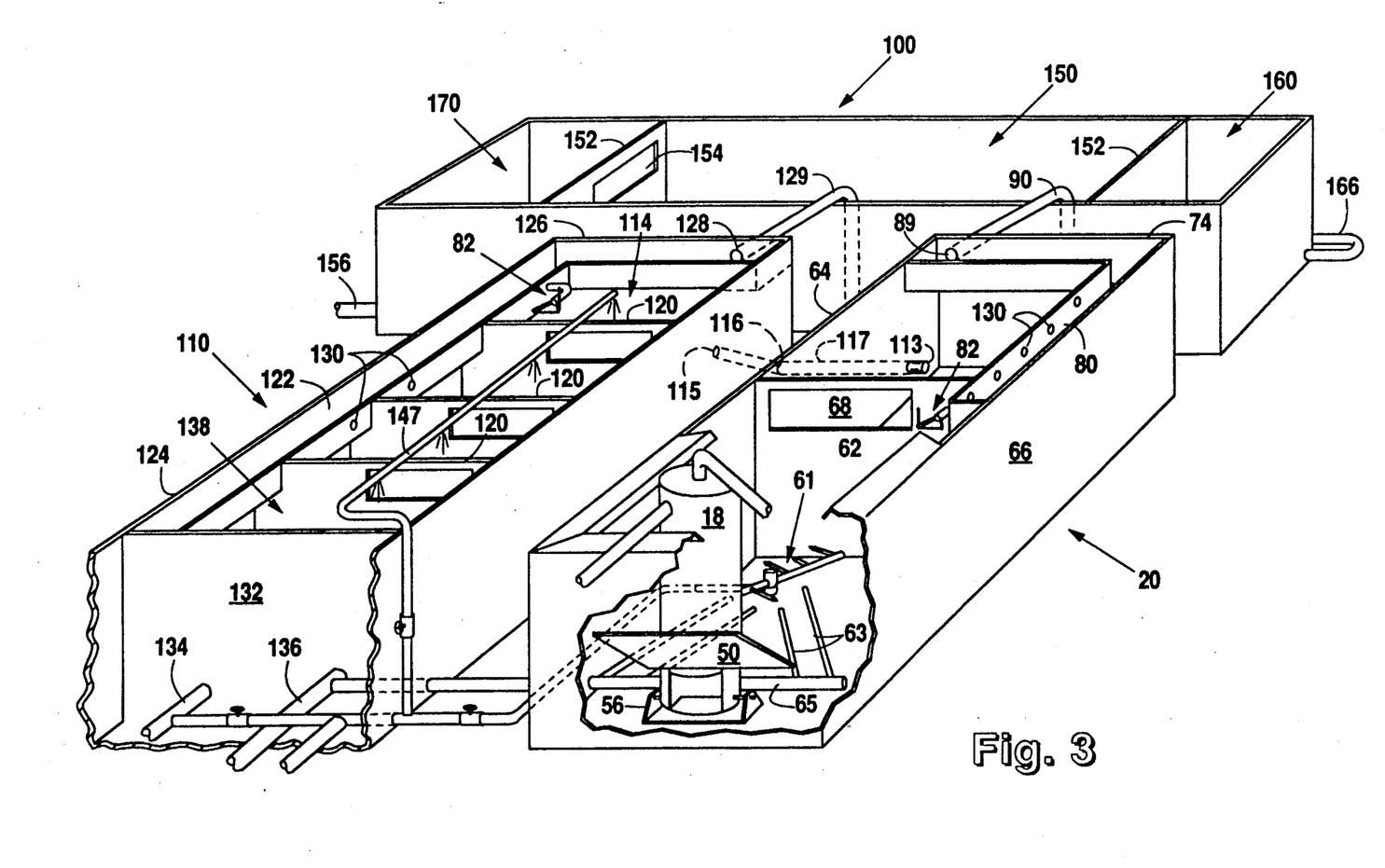
FIG. 3 illustrates a perspective view of the settling tanks of the present invention with a section cut away to expose the bottom of the first compartment of the first settling tank.
Figure 3A:
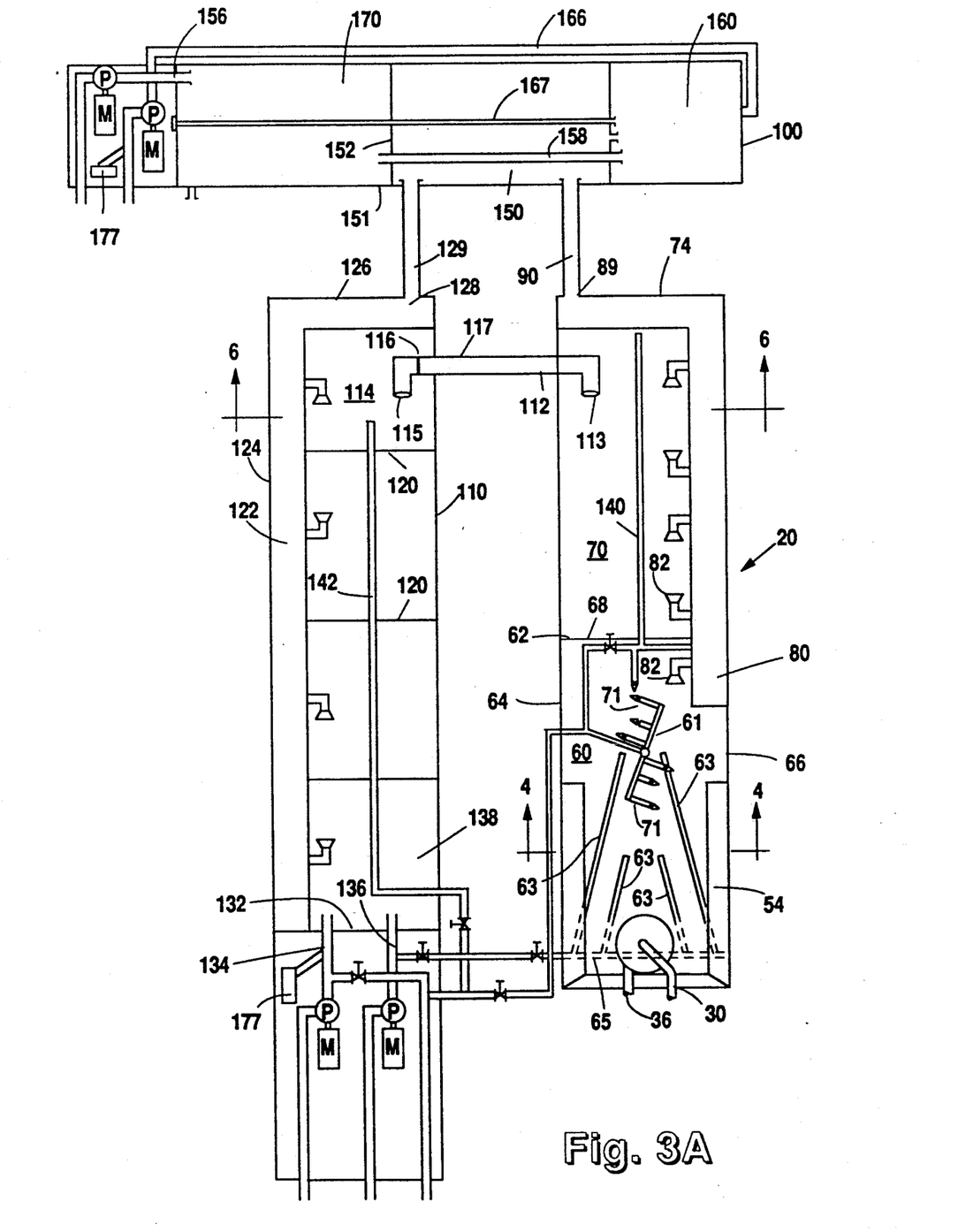
FIG. 3A illustrates a top plan view of the apparatus of the present invention.

FIGS. 3 and 3A further illustrate a first settling compartment 60 is formed in settling tank 20 by the placement of a weir 62 in the tank. The weir 62 is a generally rectangular partition wall which extends from sidewall 64 to sidewall 66 and from the bottom of the tank to the top edge of the tank. A generally rectangular opening 68 is formed in weir 62 and is approximately 18-24" high by 42-50" wide. The top edge of the opening is approximately 12-18" from the top edge of the tank. As will be discussed below, the weir 62 allows liquids to fill to a certain level in the first compartment 60 and then to flow through opening 68 into the second compartment 70 of tank 20.

Figure 4:
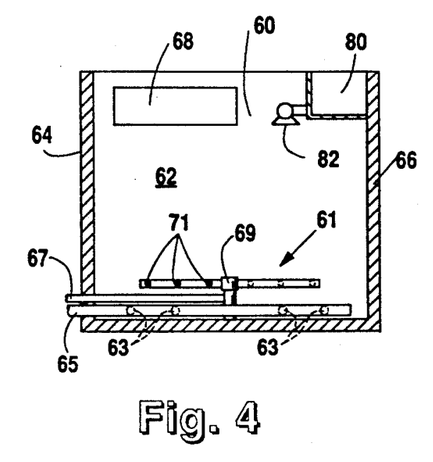
FIG. 4 is a cross-sectional view of the first compartment of the first settling tank.
Figure 4A:
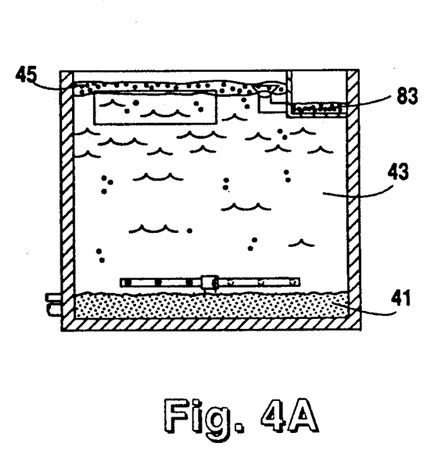
FIG. 4A is a cross-sectional view of the first compartment of the first settling tank showing the separation layers.

As may be seen in FIG. 4, first compartment 60 is provided with a whirling jet spray header 61 positioned near the bottom of the compartment 60. Several suction lines 63 branch off from a main suction header 65 also running along the bottom of compartment 60 in tank 20. As will be discussed further below, jet spray header 61 is periodically activated by supplying pressurized water to spray header 61 through feed line 67.

Because spray nozzles 71 are positioned on opposite sides at opposite ends of the spray header 61, the existing water from the nozzles forces the jet spray header to rotate about joint 69. Rotating spray headers are commonly known, but not used in the environment noted herein. The purpose of the jet 61 is to agitate the built up solids 41 on or near the bottom or lower region of compartment 60 without significantly disturbing the intermediate liquid or water/oil layer 43 or the upper layer 45 of separated oil which settles out into these layers during the separation operation. During normal operations, spray header 61 is activated from approximately 30-60 minutes three or four times each 24-hour operating period of the separation system of the present invention. Header 61 generally operates at water pressures of 60-80 psi and flow rates of approximately 75-100 gallons per minute. Again, the desired operating ranges are dependent upon the solids built-up in the compartment. Pressure and flow of water from header 61 should be sufficient only to agitate the solid layer without disruption of the oil layer. The water feeding header 61 is withdrawn from a second settling tank as will be shown later. Suction header 65 is connected to a pump to withdraw the agitated solids for disposal at the shale shaker.

Figure 5:
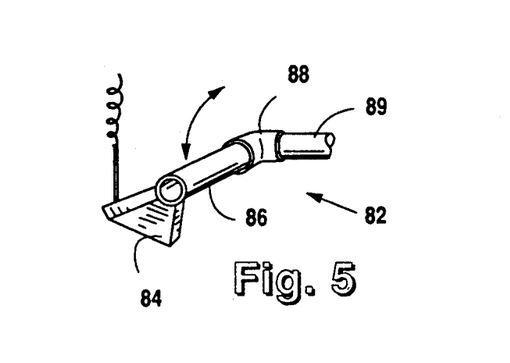
FIG. 5 is a perspective view of a duckbill skimmer of the present invention.

FIGS. 3 and 3A and FIG. 4 illustrate that an oil skimming trough 80 extends along the top portion of sidewall 66 and backwall 74 of tank 20. The trough is approximately 12-15" wide and 12-18" deep. Extending outwardly from trough 80 into the tank 20 are a series of duckbill oil skimmers 82. FIG. 5 illustrates the skimmer 82. A flared (duckbill) chute-like portion 84 is connected to a hollow tubular section or pipe 86 through which collected oil 83 may pass into trough 80. The level or height of the duckbill is adjustable by raising or lowering it by chain 88 as it rotates about swivel joint 89. Thus in operation, as solids settle to the bottom of the settling tank, and water generally settles into an intermediate layer, the oil layer forms on the top layer. Water is allowed to pass through the weir and oil is skimmed or collected by adjusting skimmers 82 to collect oil and pass it into trough 80.

FIG. 3A does illustrate at least one skimmer 82 in compartment 60, however, this skimmer may be adjusted above the oil layer if it is appropriate to not collect any oil from the first compartment. In some operations oil collection will only begin in the second compartment 70.

Oil skimmed into trough 80 flows through discharge port 89 through conduit 90 into final settling tank 100 sometimes called the oil tank as will be discussed further.

It should be understood that the water which flows through opening 68 in weir 62 still carries with it significant amounts of oil which have not yet been separated from the water. Therefore, as the water/oil (and some minor solids) are allowed to dwell in second compartment 70 of tank 20, separation of the oil and water continues. Again, a series of graduated layers of oil/water develop in second compartment 70 with the lighter oil rising to the top to be skimmed off by skimmers 82. The "purest" water layers in second compartment 70 are near the bottom of the compartment 70 immediately above any residual solids.

To provide for continuing operation of the system, unseparated oil/water must be passed to a second settling tank 110 to allow for more dwell time for the separation process. FIG. 3 shows a second settling tank 110 positioned longitudinally next to tank 20. Tank 110 is in fluid communication with tank 20 via adjustable water leg 112. Leg 112 is a conduit having a first end 113 in fluid communication with the lower portions of the second compartment 70 of tank 20 and a second end 115 in fluid communication with a first compartment 114 in tank 110. The liquid level in tank 110 is controlled by adjusting the height of the discharge of the second end 115 of leg 112 in tank 110.

Figure 6:
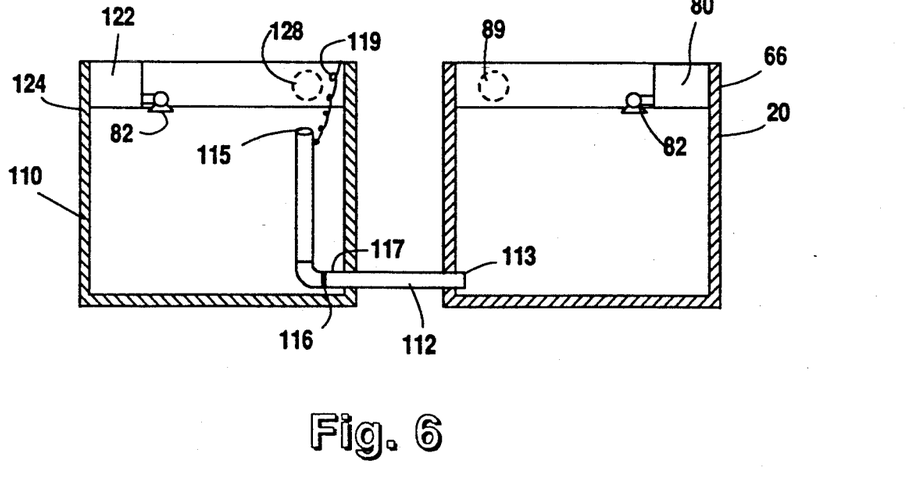
FIG. 6 is a cross-sectional view of two of the settling tanks of the present invention taken along lines 6—6 of FIG. 3A.

FIG. 6 illustrates a cross-sectional view of the tanks 110 and 20 taken along line 6—6 of FIG. 3A. Height adjustment of the discharge into tank 110 is accomplished by raising or lowering end 115 by chains 119 as it rotates about swivel joint 116 where end 115 is attached to the midsection 117 of leg conduit 112.

For example, if the flow of oil into tank 20 is slow, the operator will want to drop the fluid level in tank 20 4-5" thus allowing tank 20 to accumulate more oil on the top layer for skimming. The operator will raise the discharge height of leg 112. This will cause the level in tank 20 to rise and the oil layer will enter the duckbill skimmers for collection.

Second settling or separating tank 110 is provided with several weirs 120 each having an overflow opening as previously discussed with weir 62 in tank 20 as seen in FIG. 3. The second tank 110 is approximately 55 feet long by 10 feet wide by 8 feet high and can accommodate approximately 790 barrels of liquid.

The operation of the second tank 110 is similar to the operation of the second compartment of tank 20. Oil and water are separated by gravity with the oil layer rising to the top and the water layer gravitating to the bottom level of the tank. A skimming trough 122 extends along the top position of one sidewall 124 and backwall 126 with discharge port 128 communicating the skimmed oil into final settling tank 100 via conduit 129. For the sake of clarity a number of duckbill skimmers are not shown in FIG. 3. However, the ports 130 into the trough 122 are shown. Extending into the front bottom of compartment 138 of tank 110 are suction pipes 134 and 136. Pipes 134 and 136 pass through the forwardmost wall 132 of tank 110 and lead to pumps which transfer the accumulated water back to the well head rig (not shown) or to the whirl jet spray header 61 depending upon the appropriate piping configuration. This transfer function is controlled by an automatic water level indicator set up in tank 110. Further, the pumps connected to pipes 134 and 136 provide a backup feature to the water discharge system discussed.

FIG. 3A further illustrates that water from tank 110 may be pumped to spray bar headers 140 and 142. Headers 140 and 142 extend above tanks 20 and 110 and are operated to spray water through nozzles onto the top of the oil layer should a foaming condition develop.

The sprayer headers 140 and 142 also are used to knock down any particulate matter carried by the foam and drive it to the bottom of the tank. Chemical defoamers or de-emulsifiers may be piped into headers 140 and 142 to aid in the oil/water/solids separation process.

Figure 7:
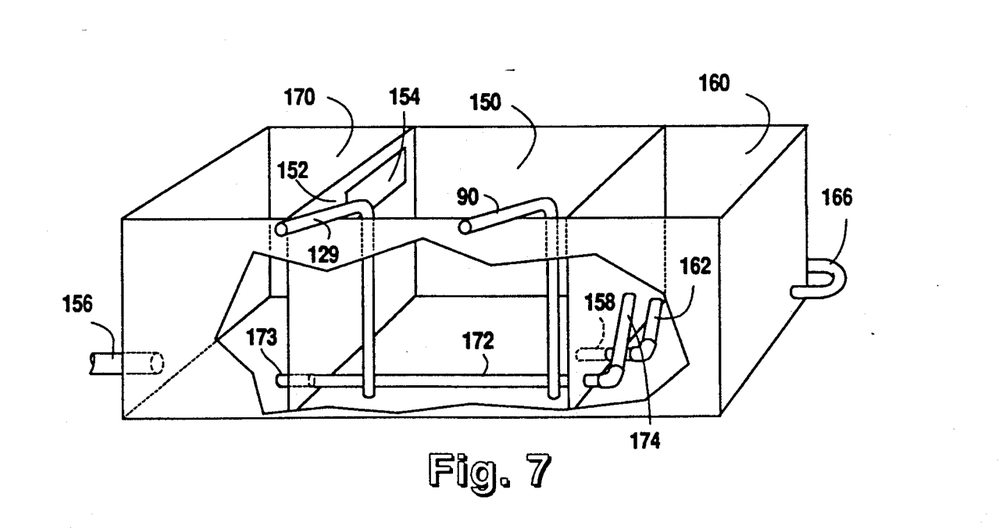
FIG. 7 illustrates a perspective view of the oil collection tank or third settling tank of the present invention.

Turning now to final settling tank 100, it may be seen in FIGS. 3, 3A and 7 that oil tank 100 has three separate compartments. A first compartment 150 may be called the oil-water compartment. A second compartment 160 may be called the water compartment. A third compartment 170 may be called the acceptable oil compartment. Oil tank 100 is approximately 40' long by 7' wide by 6'6" high with a volumetric capacity of approximately 350 barrels. It should be noted that oil skimming discharge lines 90 and 129 enter a first compartment 150 in tank 100. Lines 90 and 129 extend over the sidewall 151 and run to the bottom of tank 100. Although the fluid mix in compartment 150 is oil and water, the concentration is far more highly oil than water. By discharging lines 129 and 90 at the bottom there is little disturbance of the separation process. The water being heavier than the oil tends to remain on the bottom of compartment 150 and the oil rises. A weir 152 separates oil/water compartment 150 from oil compartment 170. An opening 154 in weir 152 allows acceptable oil (less than 2% water) to flow into compartment 170. Acceptable oil withdrawal line 156 is piped to a pump for automatically level controlled transfer to acceptable oil storage tanks 200 at another location on the job site.

In the bottom of compartment 150 is a second water leg 158 which allows for the removal of water on the bottom of compartment 150 to flow into water compartment 160. As with leg 112, the level of water in compartment 150 is controlled by adjusting the height of the discharge position of the second end 162 of leg 158.

A third water leg 172 has a first end 173 extending into the bottom of compartment 170 for any water which may separate out in this acceptable oil compartment. Leg 172 runs from the bottom of compartment 170 to the bottom of compartment 160. As with legs 112 and 158, leg 172 has a height adjustable second end 174 which controls the height of the water level, if any, in compartment 170.

Water accumulating in compartment 160 is "relatively" clean water with little oil in it. It may be transferred from compartment 160 through discharge line 166 via appropriate pumping and piping. Here again, an automatic water level control system 167 functions to activate the pumping of water from compartment 160 as needed. The discharge water from compartment 160 may be used to operate the jet spray header 61, the spray bars 140 and 142, or may be reinjected into the well head 10. All of these options may be accomplished by appropriate piping configurations.

It should be understood that the pump and motor sizes utilized in the transfer of liquids in the present inventive system may vary depending on the demands of the separation operation. Under each pump utilized with the present separation system is a sump to collect water leakage from the pump packing glands and seals. The accumulation in these sumps is drained to a trash sump 177 where it may be withdrawn for disposal either back into one of the water tanks or to an appropriate pit. Again, the elimination of spills and leakage around the tanks and pumps significantly reduces possible adverse environmental effects during the separation process.

Because of the simplicity of the present inventive system, each tank with its associated pumps and motors may be mounted on a transport or shipping skid for easy loading and hook-up unloading on a trailer. The placement of the elements of the inventive separation system is simplified by placing the ports, piping connectors, etc. in standard locations on the tanks and using standard lengths of connecting piping.

Upon completion of separation operations at a well site, the present inventive system is easily cleaned prior to removal by using clean-out drains which are placed on the lowest points in each compartment in each tank.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

What is claimed is:

1. An apparatus for continuous separation of acceptable oil from solid and liquid contaminants withdrawn from an oil well comprising:

means for continuously withdrawing oil containing said solid and liquid contaminants from a wellhead said withdrawing means in fluid communication with a first settling tank;

means for continuously transferring a portion of said contaminated oil to said first settling tank, said first tank having a volumetric capacity sufficient that said contaminated oil dwells sufficiently long enough therein for substantially all of said solid contaminants to gravitate to a lower region of said first settling tank below an intermediate liquid layer comprising said liquid contaminants and further below a top layer of separated oil in said first tank;

means in fluid communication with said first settling tank for continuously transferring a portion of said top layer of separated oil in said first tank to an oil tank and for continuously transferring a portion of said intermediate liquid layer to a subsequent settling tank;

a sprayer positioned near the bottom of said first settling tank to loosen said solid contaminants in said lower region of said first settling tank for removal by a suction device in fluid communication with said loosened solids without interruption of transfer of said portion of said contaminated oil to said first settling tank;

means in said subsequent settling tank for continuously transferring portions of a top layer of separated oil in said subsequent tank to said oil tank and for transferring a portion of said liquid contaminants back to said wellhead; said subsequent tank having a volumetric capacity sufficient that said intermediate liquid layer dwells sufficiently long enough therein for substantially all of said liquid contaminants in said intermediate liquid layer to gravitate to a lower region of said subsequent settling tank below said top layer of separated oil; and means in said oil tank for continuously transferring portions of a top layer of said acceptable oil to oil storage tanks and for transferring portions of remaining liquid contaminants back to said wellhead, said oil tank having a volumetric capacity sufficient that said separated oil from said first settling tank and said separated oil from said subsequent settling tank dwells sufficiently long enough therein for substantially all of said remaining liquid contaminants in said separated oils to gravitate to a lower region of said oil tank below said top layer of said acceptable oil.

2. The apparatus of claim 1 wherein said sprayer further comprises a means for rotating said sprayer.

3. The apparatus of claim 2 wherein said means for rotating said sprayer comprises a first set of nozzles on a first side of a sprayer header and a second set of nozzles on an opposite second side of said header, said header mounted on a rotation joint on said bottom of said first settling tank.

4. A method for continuous separation of acceptable oil from solid and liquid contaminants comprising the steps of:
   a. continuously withdrawing oil containing said solid and liquid contaminants from a wellhead;
   b. continuously transferring a portion of said contaminated oil to a first settling tank;
   c. allowing said contaminated oil to dwell within said first tank sufficiently long enough for substantially all of said solid contaminants to gravitate to a lower region of said first settling tank below an intermediate liquid layer comprising said liquid contaminants and further below a top layer of separated oil in said first tank;
   d. continuously transferring a portion of said top layer of separated oil in said first tank to an oil tank and a portion of said intermediate liquid layer to a subsequent settling tank;
   e. removing said solid contaminants in said lower region from said first settling tank without interruption of said transferring of step b by periodically activating of a rotating jet sprayer positioned on the bottom of a first compartment of said first settling tank to loosen said solid contaminants without generally disturbing said top layer of separated oil, and periodically activating a suction device to withdraw said loosened solid from said lower region of said first settling tank;
   f. allowing said portion of said intermediate liquid layer in said subsequent settling tank to dwell sufficiently long enough for substantially all of said liquid contaminants to gravitate to a lower region of said subsequent tank below a top layer of separated oil in said subsequent tank;
   g. continuously transferring portions of said separated oil in said subsequent tank to said oil tank, and a portion of said liquid contaminants back to said wellhead;
   h. allowing said separated oil from said first tank and said separated oil from said subsequent tank to dwell within said oil tank sufficiently long enough for substantially all remaining liquid contaminants in said separated oils to gravitate to a lower region of said oil tank below a top layer of said acceptable oil; and
   i. continuously transferring a portion of said acceptable oil to oil storage tanks, and a portion of said remaining liquid contaminants back to said wellhead.

* * * * *